(12) United States Patent
Rau, III

(10) Patent No.: US 10,350,512 B2
(45) Date of Patent: Jul. 16, 2019

(54) SYSTEM AND APPARATUS FOR ATMOSPHERIC WATER GENERATION USING ALTERNATE COLD SOURCES

(71) Applicant: ECO SQUARED SOLUTIONS, INC., Carlsbad, CA (US)

(72) Inventor: Charles B. Rau, III, Gig Harbor, WA (US)

(73) Assignee: Eco Squared Solutions, Inc., Carlsbad, CA (US)

( * ) Notice: Subject to any disclaimer, the term of this patent is extended or adjusted under 35 U.S.C. 154(b) by 0 days.

(21) Appl. No.: 15/100,706

(22) PCT Filed: Dec. 10, 2014

(86) PCT No.: PCT/US2014/069560
§ 371 (c)(1),
(2) Date: Jun. 1, 2016

(87) PCT Pub. No.: WO2015/089191
PCT Pub. Date: Jun. 18, 2015

(65) Prior Publication Data
US 2016/0296855 A1    Oct. 13, 2016

Related U.S. Application Data

(60) Provisional application No. 61/914,299, filed on Dec. 10, 2013, provisional application No. 62/025,360, filed on Jul. 16, 2014.

(51) Int. Cl.
*F25B 9/00*    (2006.01)
*F25B 19/00*    (2006.01)
(Continued)

(52) U.S. Cl.
CPC .......... *B01D 5/0003* (2013.01); *B01D 5/0015* (2013.01)

(58) Field of Classification Search
CPC ............... F25B 9/00; F24F 2003/144; F24F 2003/1446; F25J 2210/62; F28D 15/02; F28D 1/0226; F28D 15/025; F28D 15/0266; F28D 15/04; F24J 2/32; F28F 21/02; F28F 1/10; F28F 1/12; F28F 1/28; F28F 9/0138; F28F 2215/00; F28F 2215/04; B01D 5/00; B01D 5/0003; B01D 5/0012;
(Continued)

(56) References Cited

U.S. PATENT DOCUMENTS 6,537,351 B2    3/2003    Margiott et al.
6,604,380 B1 *    8/2003    Reddick ................. F25J 3/0214
62/617

(Continued)

OTHER PUBLICATIONS

International Preliminary Report on Patentability, dated Jun. 14, 2016, PCT/US2014/069560.

*Primary Examiner* — Brian King
*Assistant Examiner* — Erik Mendoza-Wilkenfe
(74) *Attorney, Agent, or Firm* — Randall Danskin P.S.

(57) ABSTRACT

A system and apparatus for atmospheric water generation using alternative cold sources provides a thermally conductive thermal transfer media of carbon graphitic foam for capturing cold energy by direct or indirect exposure thereto, transferring the cold energy to a condenser exposed to air having moisture, and for condensing the moisture from the air into liquid and collecting the liquid water.

11 Claims, 10 Drawing Sheets

(51) Int. Cl.
    *F28D 15/02*     (2006.01)
    *F28F 21/02*     (2006.01)
    *F28F 9/00*     (2006.01)
    *F28F 1/00*     (2006.01)
    *F28F 1/10*     (2006.01)
    *F28F 1/12*     (2006.01)
    *B01D 5/00*     (2006.01)

(58) Field of Classification Search
    CPC .. B01D 5/0015; B01D 5/0036; B01D 5/0057;
          B01D 5/0039; B01D 5/0087; B01D 5/009
    USPC ........................................................ 165/185
    See application file for complete search history.

(56) References Cited

U.S. PATENT DOCUMENTS

| | | |
|---|---|---|
| 7,861,544 B2 | 1/2011 | Ferreira et al. |
| 2004/0244398 A1 | 12/2004 | Radermacher et al. |
| 2005/0133195 A1 | 6/2005 | Weng et al. |
| 2006/0156744 A1 | 7/2006 | Cusiter et al. |
| 2007/0151262 A1 | 7/2007 | Bailey |
| 2007/0295021 A1 | 12/2007 | Tyls et al. |
| 2010/0101240 A1* | 4/2010 | Mak .................. F17C 9/02 62/50.2 |
| 2013/0025300 A1* | 1/2013 | Cho .................. F22B 1/28 62/79 |
| 2014/0020408 A1* | 1/2014 | Berchowitz ............... F25B 9/14 62/6 |
| 2014/0209168 A1* | 7/2014 | Zhamu .................. H01L 31/052 136/259 |

\* cited by examiner

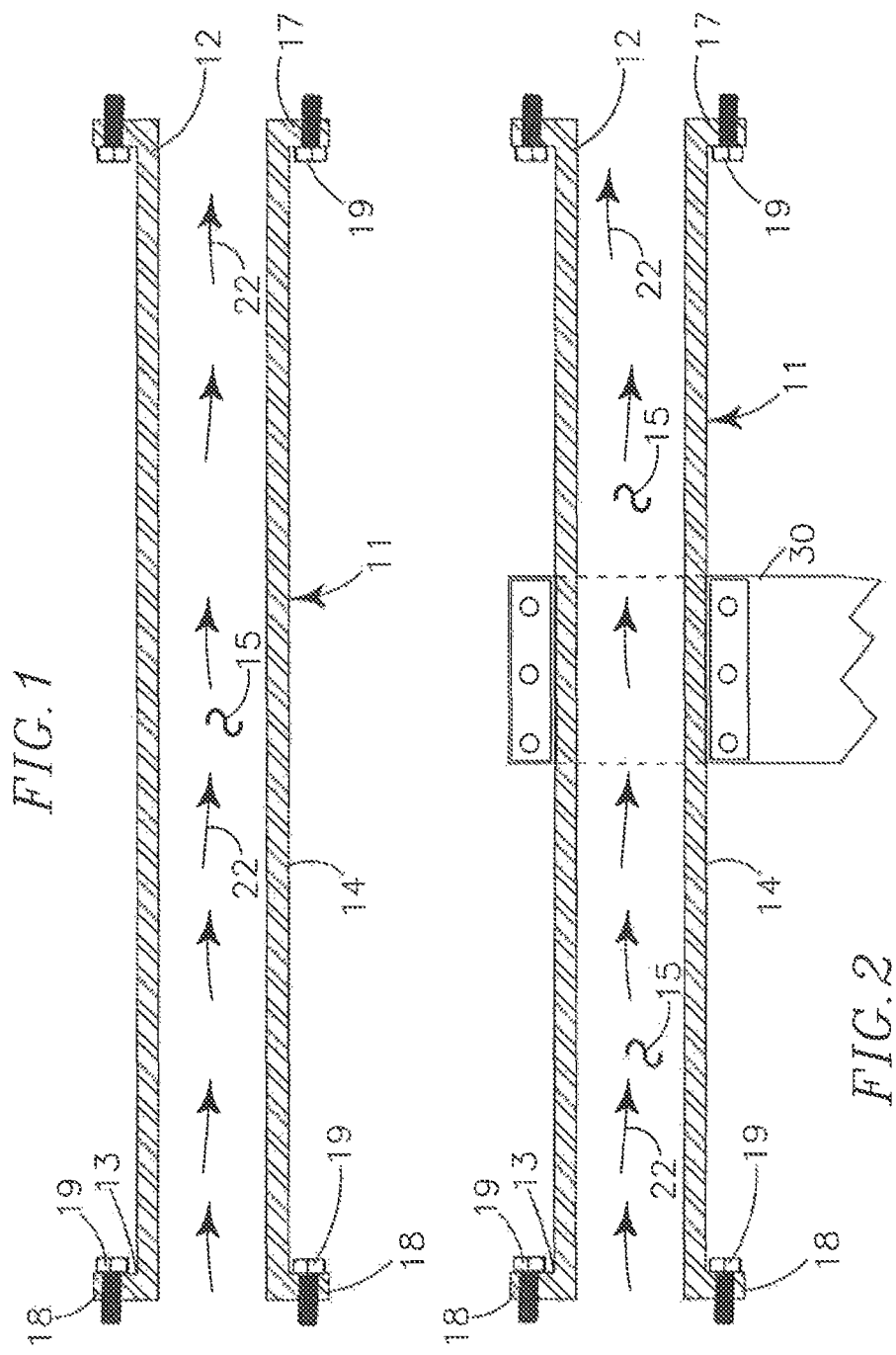

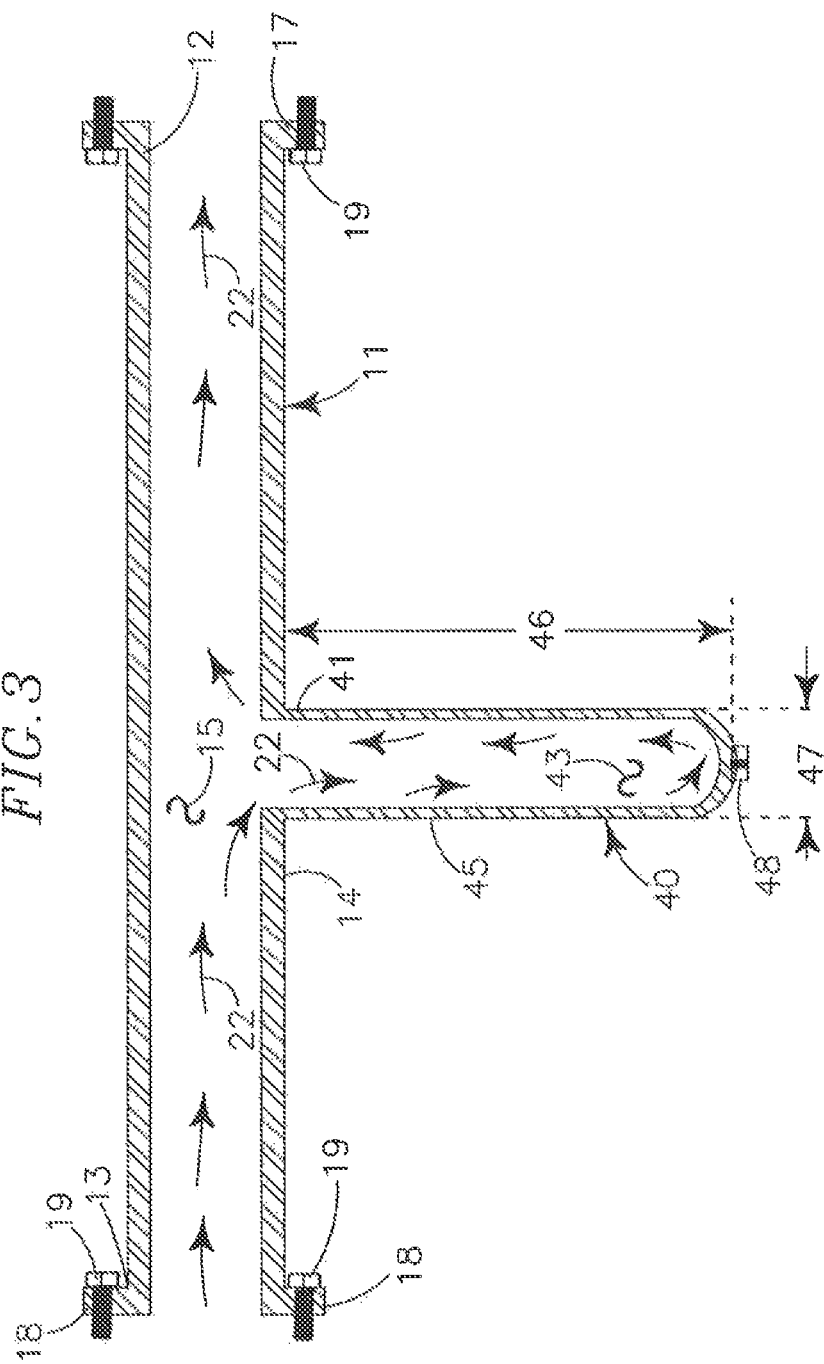

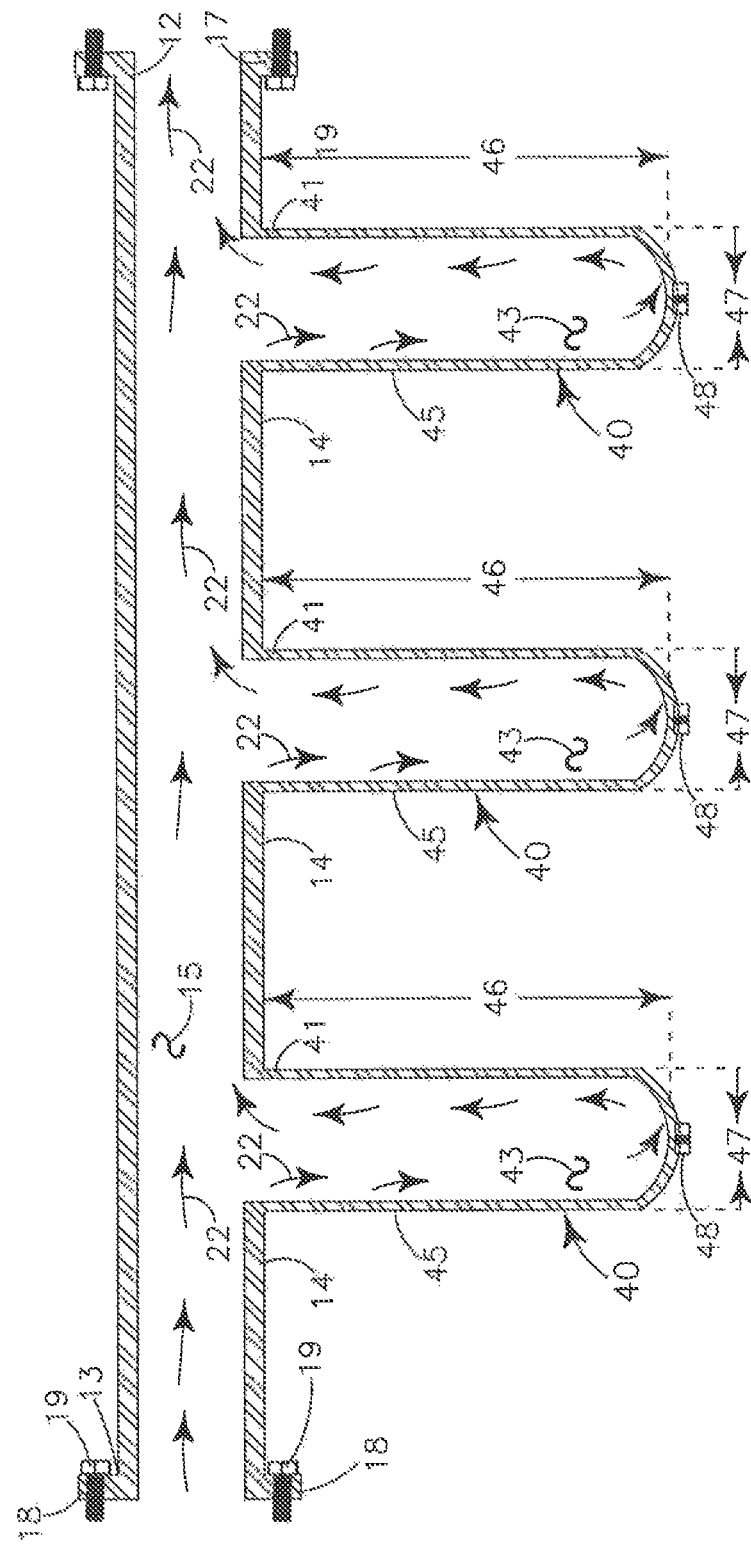

SYSTEM AND APPARATUS FOR ATMOSPHERIC WATER GENERATION USING ALTERNATE COLD SOURCES

RELATED APPLICATIONS

This Patent Application claims the benefit of earlier filed PCT Patent Application No. PCT/US2014/069560 filed on Dec. 10, 2014 and also claims the benefit of earlier filed U.S. Provisional Patent Application No. 61/914,299 filed on Dec. 10, 2013 and titled SYSTEM AND APPARATUS FOR ATMOSPHERIC WATER GENERATION USING WASTE COLD ENERGY FROM INDUSTRIAL PROCESSES and also claims the benefit of earlier filed U.S. Provisional Patent Application No. 62/025,360 filed on Jul. 16, 2014 titled SYSTEM AND APPARATUS FOR ATMOSPHERIC WATER GENERATION USING ALTERNATE COLD SOURCES. The entire contents of earlier filed PCT Patent Application No. PCT/US2014/069560 and U.S. Provisional Application No. 61/914,299, and U.S. Provisional Patent Application No. 62/025,360 are all expressly incorporated herein, in theft entirety, by this reference. U.S. 61/914,299 was assigned to Applicant Eco Squared Solutions, Inc. on Dec. 12, 2013, and said Assignment is recorded at reel/frame 31779/0129. U.S. 62/025,360 was assigned to Applicant Eco Squared Solutions, Inc. on Jul. 17, 2014, and said Assignment is recorded to reel/frame 033362/0033.

BACKGROUND OF INVENTION

Field of Invention

The present invention relates to condensers. More particularly, the present invention relates to a system and apparatus using ambient air and the cold from alternate sources including, but not limited to, waste cold from an industrial process such as, but not limited to, liquefied natural gas production to produce water.

Background

The hydraulic cycle describes the continuous movement of water on, above and below the surface of the Earth where water moves from one reservoir to another such as from the oceans and lakes to the atmosphere, through the process of evaporation, and from the atmosphere to oceans and lakes, through the process of condensation and precipitation.

Clouds are the most visible manifestation of atmospheric water, but even clear air contains vast amounts of water in particles that are too small to be visualized. It is estimated the atmosphere, at any one time, contains approximately 3095 mi.$^3$ of water which calculates to approximately 0.04% of the Earth's freshwater, and apparently 0.001% of the Earth's total water.

Liquefied Natural Gas (LNG) is made from natural gas. Natural gas is composed primarily of methane (typically 85% to 90%) but also typically contains ethane, propane and heavier hydrocarbons (butane, pentane, hexane, etc.). Small quantities of nitrogen, oxygen, carbon dioxide and sulfur compounds are also found in most sources of natural gas, but the composition may vary with geological conditions. A large percentage of commercially available natural gas is produced in coastal areas globally such as, but not limited to the Arabian Gulf states and the United States Gulf Coast. In these geographic areas it is common for fresh water to be in short supply, but the surrounding ambient air is moisture laden.

Natural gas may be transported to consumers in a gaseous form via pipeline, however when distances between point of production and point of consumption is great, liquefaction of the natural gas (to reduce its volume by a factor of approximately 600) becomes economic. Liquefied Natural Gas (LNG) is formed when natural gas is cooled to temperatures of between −159° C. to −162° C. at atmospheric pressure. At these temperatures and pressure gaseous natural gas condenses to a cold liquid.

Natural gas is liquefied through a process that involves purification, chilling and liquefaction. The first step in the process is removal of $H^2O$, $CO^2$ and acid gases such as hydrogen sulfide which, if not removed would freeze into solids and cause blockages.

The second step is chilling the natural gas to moderately low temperatures of about −35° causing condensation of heavy hydrocarbons, (notably propane and butane) which might also freeze into solids and cause blockages.

The third step is liquefaction which occurs when high-pressure liquid refrigerant is depressurized through an expansion valve. The temperature reduction is used to extract heat from the natural gas through a heat exchanger causing the gaseous natural gas to condense into a liquid.

The liquefied Natural Gas (LNG) is piped, or otherwise transferred, from the heat exchangers to tanks where the LNG may be stored. Storage pressures in such tanks is low, typically less than approximately 5 psi. Insulation on and about the storage tanks is not efficient enough, by itself, to keep the LNG sufficiently cold to remain a liquid. LNG is therefore stored as a "boiling cryogen" which utilizes a phenomenon known as "auto refrigeration" where the LNG stays at a near constant temperature if kept at a constant pressure. This constant temperature is maintained so long as the LNG vapor "boil-off" is allowed to exit the storage tank. The vapor is either removed and used as fuel or is reliquified and returned to the storage tank.

The cold vapor off-gassed from the LNG is an energy source because it provides a temperature differential between the cold LNG and the surrounding atmosphere. This temperature differential provides a power source for the instant system and apparatus for atmospheric water generation.

The instant invention uses a unique thermal transfer media formed from synthetic carbon graphitic foam such as that described in U.S. Pat. No. 6,033,506 to Klett for Process for Making Carbon Foam and its related patent applications and issued patents as its means for capturing, transferring, and using the cold for water generation.

The thermal transfer media is light weight, weighing on average approximately 3-15 lbs. per cubic foot and is highly thermally conductive with a conductivity of up to approximately 1,800 W/m.K (watts per meter Kelvin) as compared to Copper (Cu) which has a thermal conductivity of approximately 400 W/m.K. Further, the thermal transfer media is highly electrically conductive nearly matching the electrical conductivity of copper.

The carbon graphitic foam thermal transfer media is produced by high-temperature treatment of amorphous carbon materials. The primary feedstock for making synthetic graphite is calcined petroleum coke and coal tar pitch, both of which are highly graphitizable forms of carbon. The manufacturing process generally consists of mixing, molding, and baking operations followed by heat-treatment to temperatures between approximately 2500 C and 3000 C. The heat drives the solid/solid, amorphous carbon-to-graphite phase transformation. The morphology of synthetic graphite varies from "flaky" in fine powders to irregular round grains in coarser products which is caused by high temperature vaporization of volatile impurities, which include most metal oxides, sulfur, nitrogen, hydrogen, and all organic components. The thermal transfer media may be formed into solid shapes of nearly any configuration.

The atmosphere contains moisture, and the moisture content is dependent upon the air temperature. In general, the warmer the air, the more moisture the air is capable of carrying. Likewise, the cooler the air, the less moisture the air is capable of carrying. Water condensers operate using "dew point" and temperature difference.

Condensers remove moisture from the air by "taking in" warm moisture laden air, and cooling the air to a temperature at which the air can no longer contain the moisture. Upon cooling, the moisture condenses to a liquid which may be collected. The cooler, dryer air is removed (vented outwardly) and more warm moisture laden air is "taken in" as the process continues.

One drawback to known condensers is the need for enormous energy input to reduce the temperature of the moisture laden air to cause "condensation." The energy input is generally provided by an external electrical sources or generators which power compressors to drive a refrigeration apparatus. The power input required for the refrigeration process has historically made condensers expensive, complex and at times uneconomical.

The instant invention utilizes cold from alternate cold sources including waste cold from industrial processes, including but not limited to liquefied natural gas (LNG) production as the energy input for condensing moisture from air.

For purposes of this patent disclosure the cold source is cold from the production of Liquified Natural Gas (LNG) however other sources of cold are expressly contemplated as well and may similarly be used as a cold source for the instant invention. Other contemplated cold sources include, but are not limited to, cryocoolers and acoustic wave form engines such as those manufactured and sold by Qdrive™/ Chart Industries of Troy N.Y., USA, Stirling refrigerators, GM refrigerators, Pulse-tube refrigerators, and Joule-Thomson coolers. The cold may be intentionally generated or waste cold.

The instant thermal transfer media is used to wrap, enclose or otherwise communicate with a cold source including transfer means and storage apparatus containing LNG. It is further contemplated the thermal transfer media may be exposed, directly or indirectly, to the LNG and/or the "boil-off" vapors of LNG. The cold of the apparatus containing the LNG, or the "boil-off" vapors is thermally transferred to a condenser apparatus, using the thermal transfer media's properties of thermal conductivity.

A plurality of through pores defined in the carbon graphitic foam thermal transfer media which are created during the formation of transfer media dramatically increase the amount of surface area available which even further enhances the thermal conductivity of the material. The thermal conductivity works in two "directions", first by transferring the cold from the cold source into a condenser apparatus to cool the warm moist air flowing thereover and thereabout to a temperature below the air's dew point, and also to cause the thermal transfer media to absorb heat/ warmth from the warm moist air flowing thereover and thereabout to cause any ice crystals that may form on the thermal transfer media, or in the pores to melt into liquid water for collection. The high thermal conductivity of the thermal transfer media enhances both aspects of producing water from ambient air, namely the cooling of air below its dewpoint, and the melting of ice crystals formed on the thermal transfer media into liquid water.

The size and number of the through pores may be optimized during the manufacturing of the thermal transfer media to further enhance thermal conductivity and to optimize use in particular situations, configurations, and environments such as, but not limited to, increasing the number and size of the pores, by reducing the size of the pores while maintaining a high number of pores, by reducing the number of pores while increasing the size by reducing the number of pores and the size of the pores or variations thereof. The densification of the thermal and carbon media may be adjusted, altered and optimized to best suit particular conditions/installations.

Within a condenser container which defines an Interior volume, the thermal transfer media is formed into a body which may have a configuration of a hollow cylinder with cooling vanes thereon or the like. In another embodiment the body may carry a plurality of thermally conductive plates in spaced array. The plurality of plates may be formed from the thermal transfer media, or other thermally conductive materials such as, but not limited to copper, and are interconnected to the body so that thermal energy is passed by conduction from the body to the plates/vanes causing the plates/vanes to cool. The plates/vanes have a greater surface area than the body and therefore have greater ability to cool a larger volume of moisture-laden air passing thereover and thereabout. One preferred configuration of the condenser is that of an "inverted cone" formed of plural spaced apart parallel plates with larger diameter plates at the highest vertical level and each lower plate having a smaller diameter.

An air moving system, employing known HEPA type filters draws a continuous supply of warm moisture laden air from the exterior the container into an interior volume defined by the container. A plurality of thermal transfer bodies may be carried in spaced array within the volume of the container. As warm moisture laden air passes over and about the thermally conductive plates, moisture within the air condenses upon the cold plates and falls, under the power of gravity to a collection basin maintained thereunder. Moisture collected within the collection basin is then "piped off" to a storage facility for later use. The HEPA filters, having previously removed all airborne contaminants cause the condensed water to be of potable quality.

The instant invention has minimal moving parts and may use waste cold that is otherwise lost and wasted to the environment as well as intentionally generated cold.

The instant invention provides a thermal transfer media to efficiently capture cold and transfer the cold to condensing apparatus for condensation of moisture from ambient air.

The instant invention provides a means for using waste cold as an energy source.

The instant invention provides means for producing water from ambient air using low energy input and environmentally sensitive apparatus.

Some or all of the problems, difficulties and drawbacks identified above and other problems, difficulties, and drawbacks may be helped or solved by the inventions shown and described herein. The instant invention may also be used to address other problems, difficulties, and drawbacks not set out above or which are only understood or appreciated at a later time. The future may also bring to light currently unknown or unrecognized benefits which may be appreciated, or more fully appreciated, in the future associated with the novel inventions shown and described herein.

BRIEF SUMMARY OF THE INVENTION

A system and apparatus for atmospheric water generation using cold provides a thermally conductive thermal transfer media to capture cold by direct or indirect exposure thereto, transferring the cold to a condenser exposed to air having moisture and for condensing the moisture from the air into liquid and collecting the liquid water.

In providing such a system and apparatus for atmospheric water generation using alternative sources of cold it is:

a principal object to provide a system and apparatus for producing water from air.

a further object to provide a system and apparatus for producing potable water from air.

a further object to provide a system and apparatus having minimal moving parts.

a further object to provide a system and apparatus that uses as its energy input, waste cold.

a further object to provide a system and apparatus that uses as its energy input, cold from an industrial process.

a further object to provide a system and apparatus using a thermal transfer media that may communicate directly with a cold source.

a further object to provide a system and apparatus using a thermal transfer media that may communicate indirectly with a cold source.

a further object to provide a system and apparatus that is size configurable.

a further object to provide a system an apparatus that may be mobile.

a further object to provide a system and apparatus that requires minimal energy input.

a further object to provide a system an apparatus that may be "piggy backed" onto a source of cold that may be waste cold or intentionally produced cold.

a further object to provide a system and apparatus that may be piggy backed onto a variety of Industrial processes that produce waste cold without negatively affecting the industrial process.

a further object to provide a system and apparatus that uses solid cold transfer components.

a still further object to provide a system and apparatus that is environmentally friendly and does not produce harmful byproducts.

Other and further objects of the instant invention will appear from the following specification and accompanying drawings which form a part hereof. In carrying out the objects of the instant invention it is to be understood that its structures and features and steps are susceptible to change in design and arrangement and order with only one preferred and practical embodiment of the best known mode being illustrated in the accompanying drawings and specified as is required.

BRIEF DESCRIPTION OF THE DRAWINGS

Preferred forms, configurations, embodiments and/or diagrams relating to and helping to describe preferred aspects and versions of the instant invention are explained and characterized herein, often with reference to the accompanying drawings. The drawings and features shown herein also serve as part of the disclosure of the instant invention, whether described in text or merely by graphical disclosure alone. The drawings are briefly described below.

FIG. 1 is an orthographic cross section side view of a typical section of flanged pipe with arrows showing flow of cold (gas or liquid) therethrough.

FIG. 2 is an orthographic cross section side view of a section of flanged pipe, similar to that of FIG. 1 showing an external thermally conductive clamp attached to and communicating with an outer circumference of the pipe section.

FIG. 3 is an orthographic cross section side view of a modified segment of flanged pipe showing a hollow protuberance on the pipe segment and showing flow of cold gas/liquid through the pipe and into and out of the hollow protuberance.

FIG. 4 is an orthographic cross section side view of a segment of flanged pipe, similar to that of FIG. 3 showing plural spacedly arrayed hollow protuberances on the pipe and cold flow therethrough.

DETAILED WRITTEN DESCRIPTION

Figure 5:
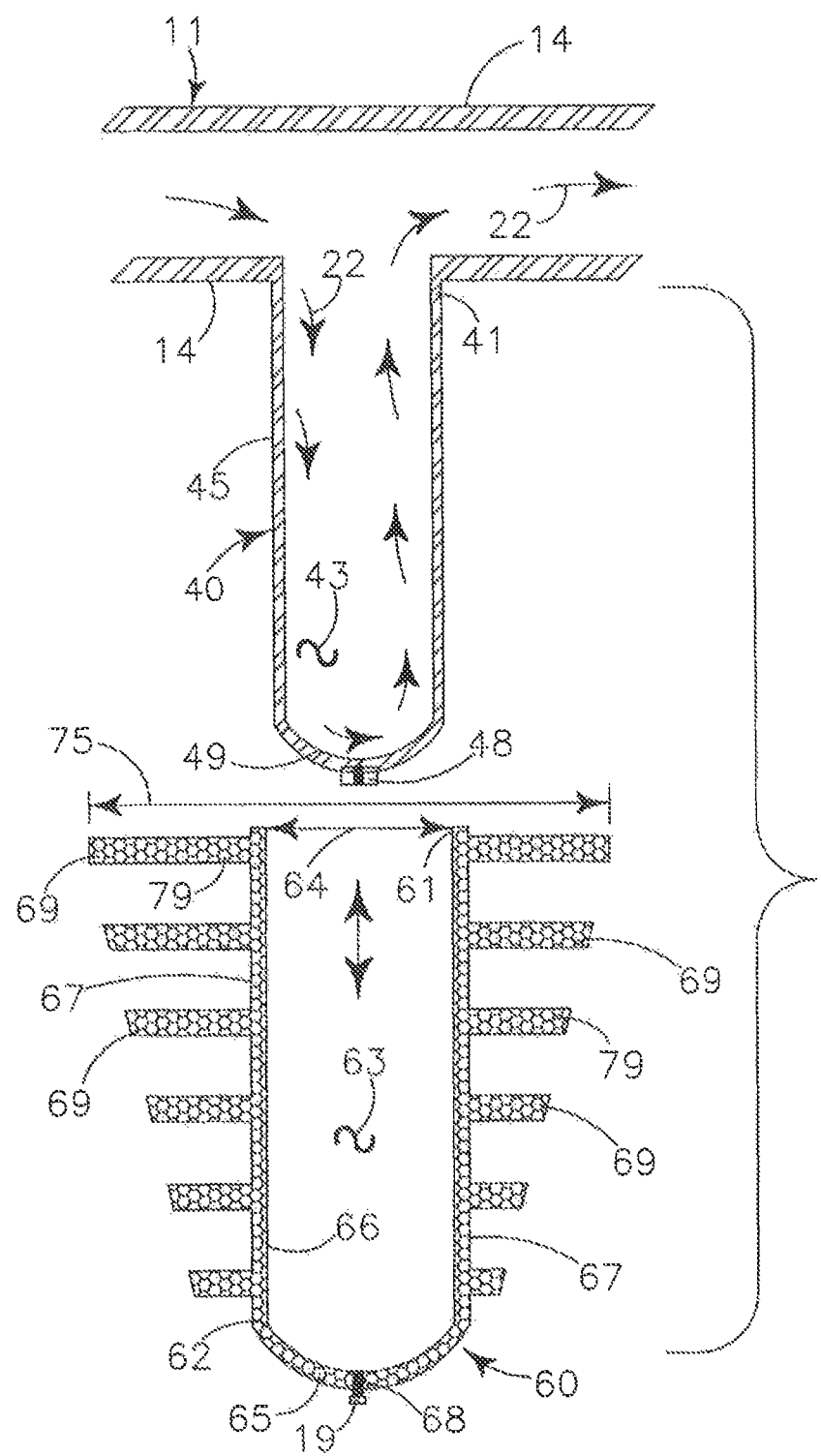
FIG. 5 is an orthographic cross section side view of a segment of flanged pipe similar to that of FIG. 3 and an orthographic cross section side view of one embodiment of a condenser showing a hollow thermally conductive body carrying plural spacedly arrayed cooling plates on an outer circumferential surface, the thermally conductive body axially aligned with the cold pipe protuberance to show how the thermally conductive body engages with the protuberance.
Figure 6:
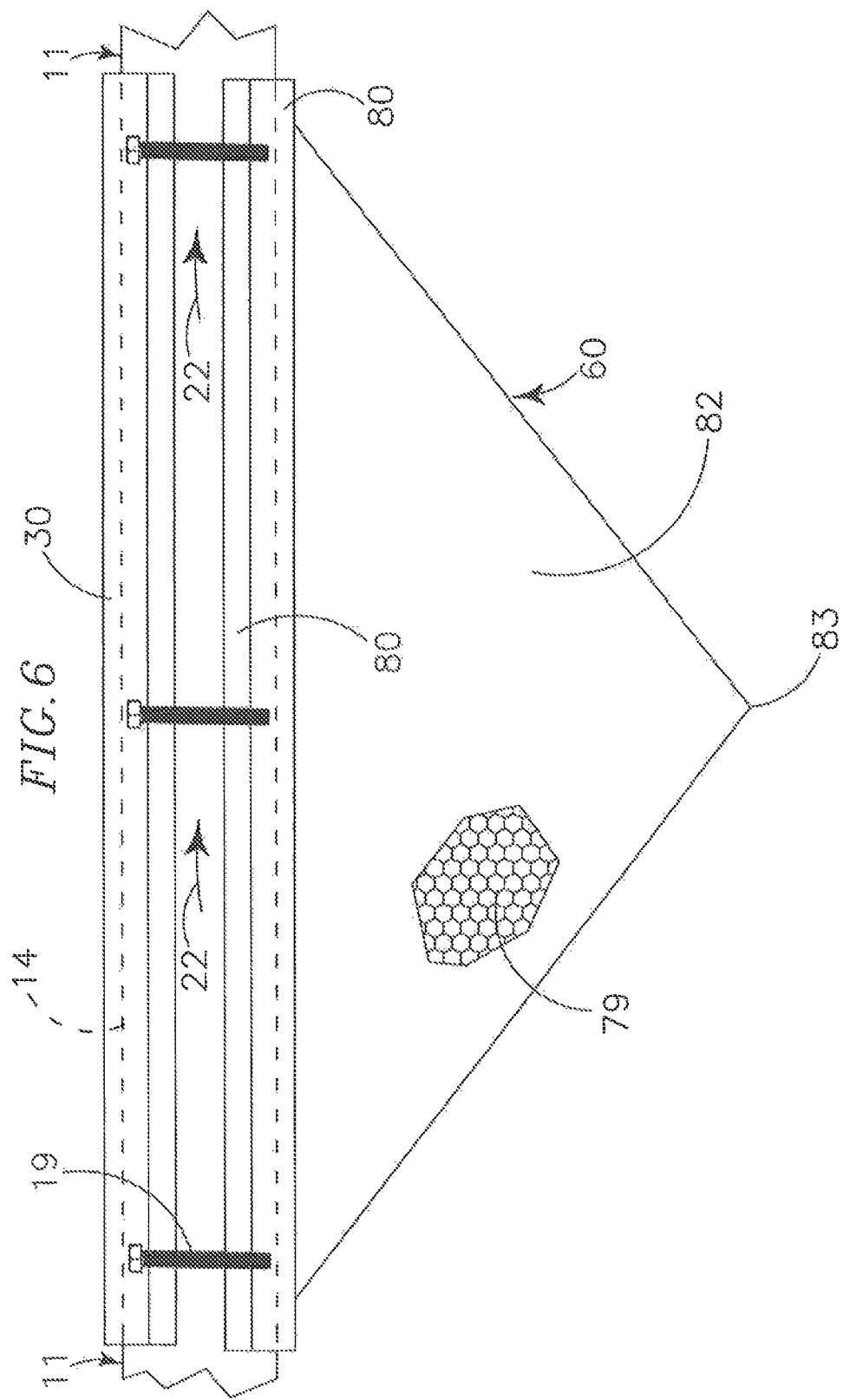
FIG. 6 is an orthographic side view of one embodiment of an external conductive clamp for attachment to a cold pipe, the conductive clamp carrying a triangular shaped planar cooling plate.

The readers of this document should understand that dictionaries were used in the preparation of this document. Widely known and used in the preparation hereof are *The American Heritage Dictionary*, 4$^{th}$ Edition (©2000), *Webster's New International Dictionary*, Unabridged, (Second Edition ©1957), *Webster's Third New International Dictionary* (© 1993), *The Oxford English Dictionary* (Second Edition, ©1989), and *The New Century Dictionary* (©2001-2005), all of which are hereby incorporated by this reference for interpretation of terms used herein, and for application and use of words defined in such references to more adequately or aptly describe various features, aspects and concepts shown or otherwise described herein using words having meanings applicable to such features, aspects and concepts.

This document is premised upon using one or more terms with one embodiment that may also apply to other embodiments for similar structures, functions, features and aspects of the inventions. Wording used in the claims is also descriptive of the inventions, and the text of both claims and abstract are incorporated by this reference into the description entirely.

The instant system and apparatus for atmospheric water generation using alternate cold sources including but not limited to waste cold from industrial processes generally provides a condenser 60 formed at least partially of thermal transfer media 79, communicating with a cold source 11, 24, a fluid collection basin 100, a container 90 and an air moving means 91.

Various industrial processes generate as a waste product thermal energy. For purposes of this patent disclosure, the thermal energy is "cold" as opposed to "heat," and "cold" Is defined as a temperature lower than the ambient temperature of the surrounding unconditioned/untreated atmosphere. A variety of known industrial processing, including, but not limited to, production of liquefied natural gas (LNG), production of dry ice, cryogenics, production of ice, and production of a variety of compressed gases are all known to generate cold which is commonly wasted to the environment. Other known apparatus such as cryogenic coolers, such as those manufactured/sold by Qdrive™/Chart Industries™ of Troy N.Y., USA likewise may be used in the instant system and apparatus to generate the cold temperatures. For purposes of this patent disclosure, this cold is described as "waste cold" but it is contemplated that intentionally produced cold may also be used, such as the cold generated by air conditioners, compressors and the like.

In the preferred embodiment, the instant system and apparatus is described as utilizing waste cold from liquefied natural gas (LNG) operations, but it is contemplated that the instant system and apparatus may be used with a variety of industrial processes that generate cold temperatures. The cold energy is the powering energy for the instant system and apparatus for atmospheric water production.

As described previously, liquefied natural gas (LNG) operations compress refrigerants to extremely high pressures which are thereafter released through a pressure valve. The rapidly expanding refrigerants passing through the pressure valve generate extremely low temperatures in the neighborhood of minus 150° Celsius. These low temperatures extract heat energy from the natural gas which causes the natural gas to condense into a liquid. The liquefied natural gas (LNG) is collected and transferred via known pipes 11 and plumbing connections to a cold fluid storage apparatus 23 which may be a tank or the like. As noted previously, liquefied natural gas (LNG) will remain in a liquid state by the process of auto refrigeration when vapor "boil-off" is allowed to occur and the liquid is kept at a constant pressure. The "off gassing" vapor and the constant pressure is an equilibrium state causing the liquid to maintain a constant temperature of approximately minus 150° Celsius.

The liquid natural gas (LNG) may be transported in pipes 11, and is stored in known storage facilities 23 such as tanks. These pipes 11 and storage facilities 23 are typically formed of high strength non-corrosive steel and other known alloys capable of withstanding the extreme low temperatures. Known types of insulation (not shown) are commonly used to wrap and otherwise enclose the pipes 11 and plumbing fittings and storage apparatus 23 used to transport and store the liquid natural gas (LNG). The objective of the insulation is to prevent "warming" of the LNG which exacerbates and speeds up the rate of the vapor "boil-off."

Figure 9:
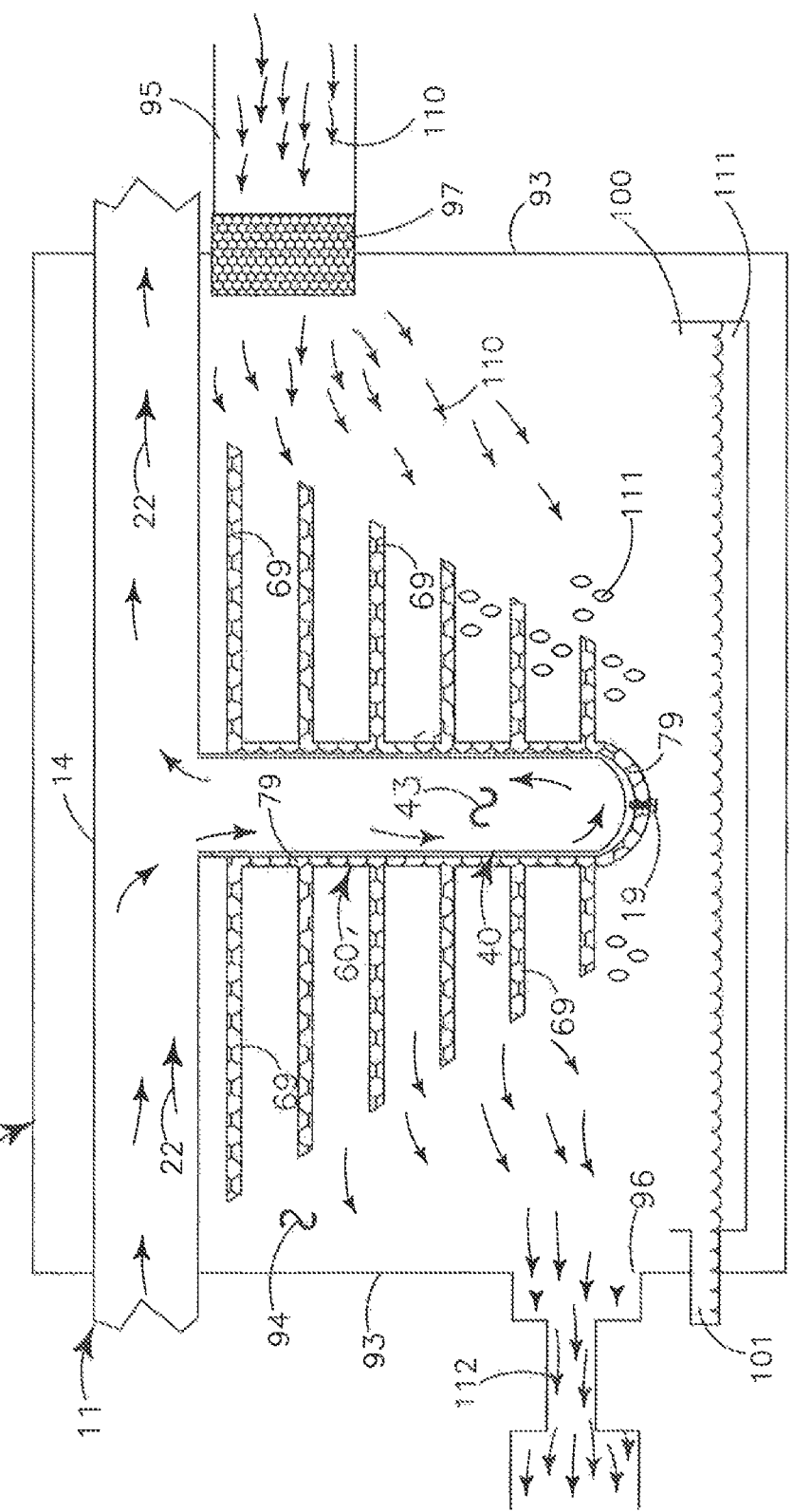
FIG. 9 is an orthographic cross section side view of the first embodiment of a thermal transfer body communicating with a pipe protuberance inside a condenser container with a fluid collection basin with arrows showing the flow of air through the container and water droplets falling from the cooling plates into the fluid collection basin.

Cold from the LNG is collected using the high thermal conductivity of the thermal transfer media 79 which is approximately 1,800 W/m.K (watts per meter Kelvin). Placement of the thermal transfer media 79 immediately adjacent the cold source, which may be, but is not limited to, a pipe 11, or a storage container 23, or exposure to the boil off vapor 24 (FIG. 9), or direct emersion in the cold draws the cold into the thermal transfer media 79. Because the thermal transfer media 79 has such high thermal conductivity, exposing one portion of the thermal transfer media 79 to the cold source 11, 22, 23, 24 causes the entire body of thermal transfer media 79 to become cold or otherwise attain a temperature that is the same as, or approximately the same as, the temperature of the cold source 11, 22, 23, 24. It is expressly contemplated that nearly any source of cold may be used as the cold source for the instant system and apparatus.

The thermal transfer media 79 is formed of synthetic carbon graphitic foam. The process of making the synthetic carbon graphitic foam is described in U.S. Pat. No. 6,033,506 to Klett for Process For Making Carbon Foam and its related patent applications. The thermal transfer media 79 captures the cold by conduction, and transfers the captured cold to the condenser 60 which is carried inside a container 90 that defines an interior volume 94.

In a preferred embodiment, as shown in FIG. 5 the pipe 11 is modified to include a pipe protuberance 40 that extends angularly from an outer circumferential surface 14 of the pipe 11. The protuberance 40 has a first end portion 41 proximate the pipe 11 and a second end portion 42 distal from the pipe 11. The second end portion 42 is preferably blocked with an end portion 49 that seals a medial channel 43. The protuberance 40 medial channel 43 communicates with medial channel 15 defined by the pipe 11 so that cold fluids (and gasses) within the pipe 11 medial channel 15 may pass into, and out of, the medial channel 43 of the protuberance 40. A threaded blind hole 48 is carried on the end portion 49 to allow attachment of a condenser 60 to the protuberance 40.

Figure 7:
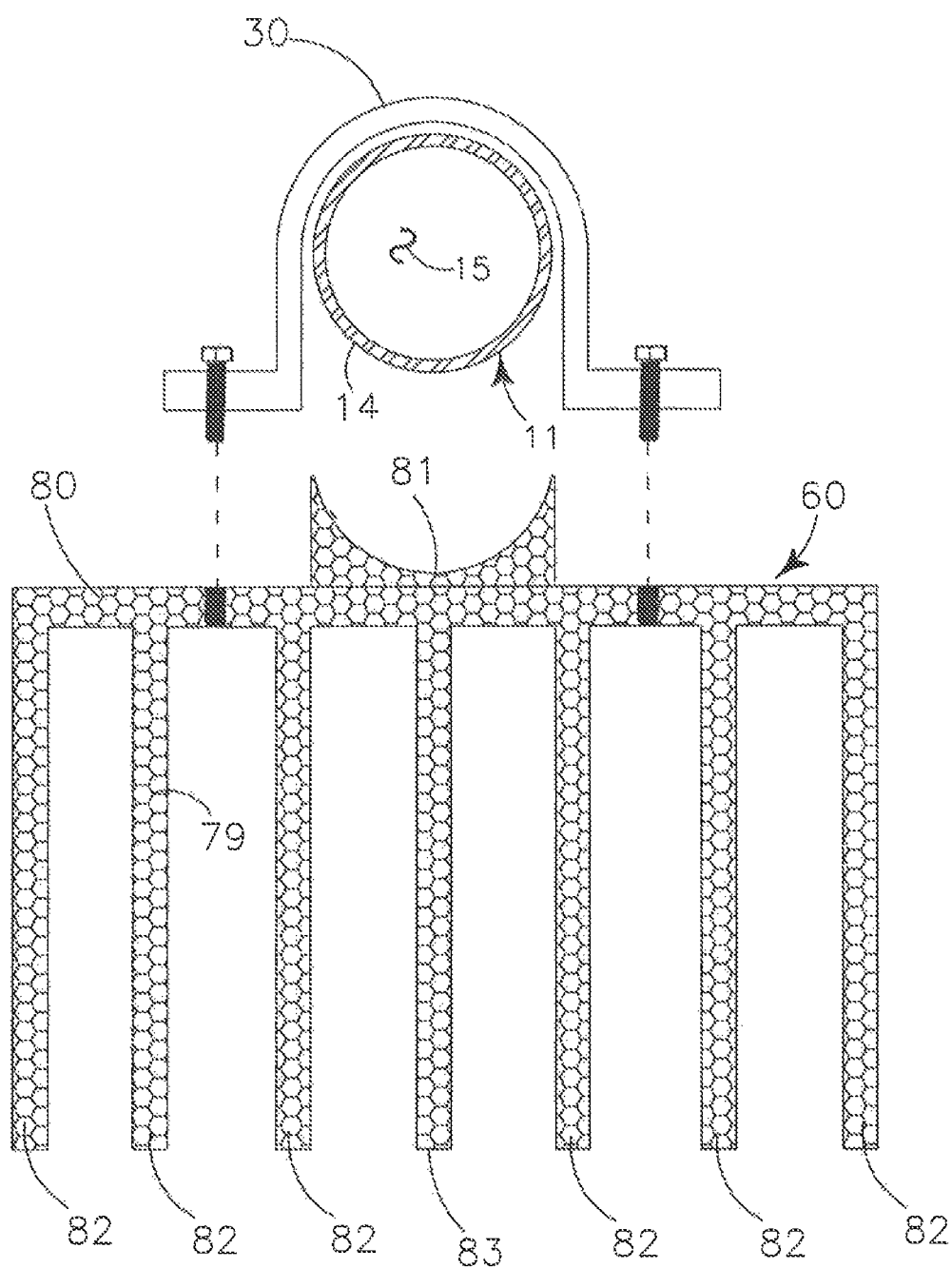
FIG. 7 is an orthographic end view of the external conductive clamp of FIG. 6 showing plural spacedly arrayed cooling coil plates extending from the body showing the arrangement of the components relative to a cold pipe source.
Figure 8:
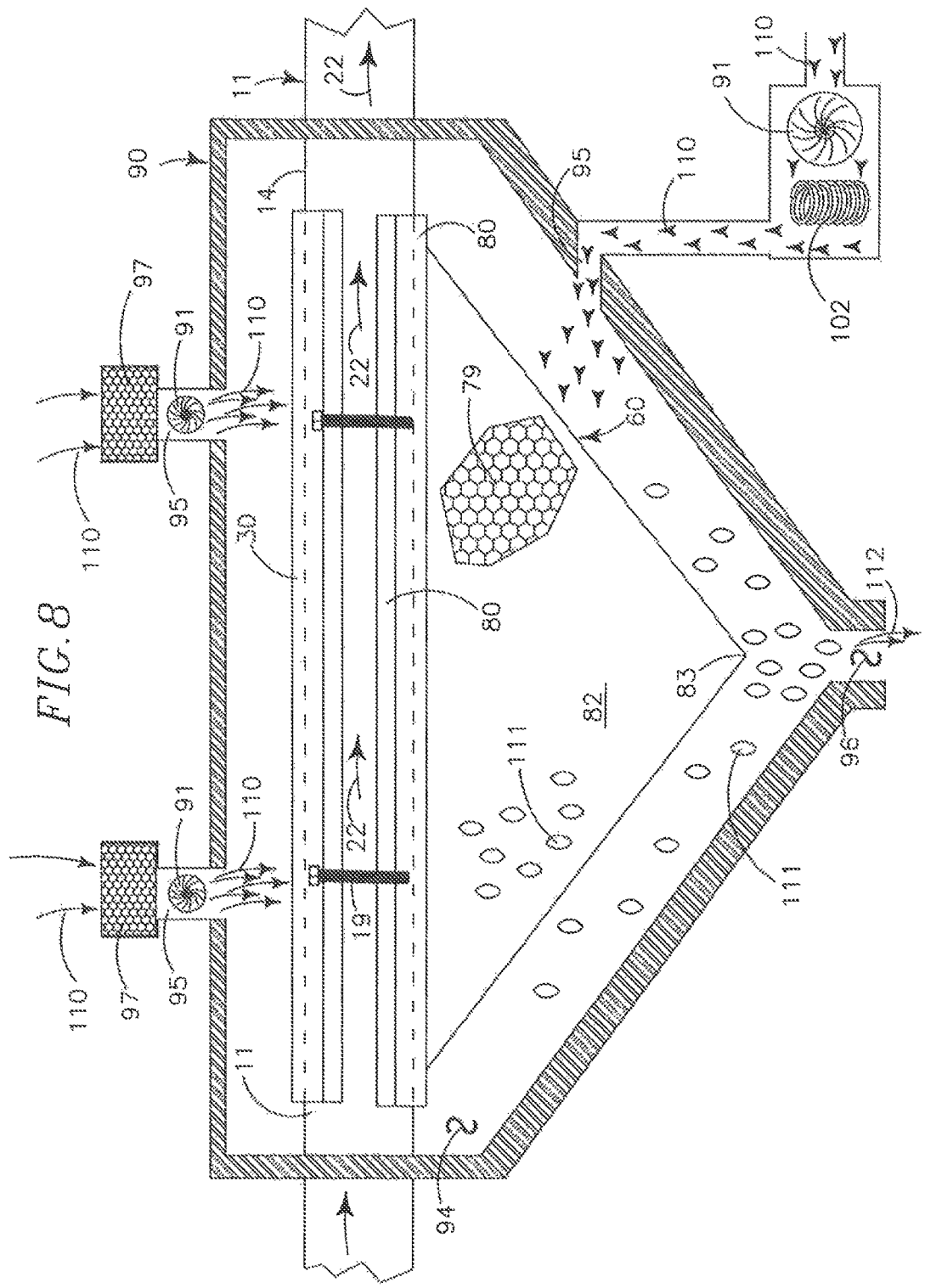
FIG. 8 is an orthographic cross section side view of the condenser of FIG. 7 attached to a cold source pipe within a volume defined by a condenser container showing air inlets with filters, a fluid outlet liquid water droplets and arrows representing the passage of air into and through the container volume.

In another preferred embodiment, as shown in FIGS. 2, 6, 7 and 8, cold from the pipe 11 is collected by fastening a partially circumferentially extending clamp 30 and body 80 about an outer circumferential surface 14 of the pipe 11 carrying the cold fluid 22. The body 80 is at least partially formed of the thermal transfer media 79 and the clamp 30 and body 80 are maintained in direct physical contact with the outer circumferential surface 14 of the pipe 11. The cold temperature of the cold fluid passing through the pipe 11 is conducted to the outer circumferential surface 14 of the pipe 11 by conduction and the cold is collected by the body 80. As shown in FIG. 7, the body 80 has a saddle 81 and carries plural planar spacedly arrayed cooling plates 82 formed of the thermal transfer medial 79.

As shown in FIGS. 5 and 7 the condenser 60 may be formed from a solid block of the thermal transfer media 79, or a combination of thermal transfer media 79 and other material that is thermally conductive such, but not limited to, copper or steel or an alloy the materials may be interconnected or bonded together by known means including, but not limited to, thermally conductive adhesives. The condenser 60 has a first end portion 61, a second end portion 62 and in one embodiment (FIG. 5) defines a medial channel 63 extending from a channel opening 64 at the first end portion 61 and terminating at a blocked end 65 proximate the second end portion 62. The condenser 60 has an internal circumferential surface 66 inside the medial channel 63 and an outer circumferential surface 67 on its exterior. A bolt hole 68 is defined in the second end portion 62 and communicates through the blocked end 65 so that a threaded fastener 19 may be used to attach and positionally maintain the condenser 60 on the protuberance 40.

Cooling plates 69 are carried on the outer circumferential surface 67 of the condenser 60 and extend generally radially therefrom in spaced array. In one preferred embodiment, plural cooling plates 69 are carried by the condenser 60 and cooling plates 69 having larger diameters 75 are proximate the first end portion 61 while cooling plates 69 having smaller diameters 75 are carried proximate the second end portion 62 to maximize cold thermal transfer diameters 75 and thicknesses (not shown) of the cooling plates 69 may be adjusted and optimized as needed for each application which may vary with average humidity labels and the like.

As shown in FIG. 5, in one embodiment the condenser 60 slides axially over the protuberance 40 with an outer circumferential surface 45 of the protuberance 40 directly physically communicating with an inner circumferential surface 66 of the condenser 60 medial channel 63. The condenser 60 is positionally maintained on the protuberance 40 with threaded fastener 19 extending through the bolt hole 68 and engaging with the threaded blind hole 48. Length of the condenser 60 medial channel 63 is preferably the same as length 46 of the protuberance 40 and channel opening 64 of the medial channel 63 is preferably only slightly larger than outside diameter 47 of the protuberance 40 to maximize thermal transfer to the condenser 60.

It is contemplated plural condensers 60 may be carried in spaced apart array on a single pipe 11, or on plural proximate pipes 11 carrying the cold fluid 22 so that the plural condensers 60 may be carried within a single container 90 to facilitate air flow and maximize water generation.

In another embodiment (FIG. 7) the condenser 60 has a body 80 defining a saddle 81 with a radius that matches that of the pipe 11 to which the condenser 60 is mounted using pipe clamp 30. The condenser 60 may be formed from a solid block of thermal transfer media 79 so that the body 80, saddle 81 and cooling plates 82 are structurally interconnected. It is also contemplated the cooling plates 82 may be formed separately from the body 80 and thereafter attached to the body 80 and saddle 81 by known means, such as, but not limited to, fasteners (not shown) and/or conductive adhesive so that the cooling plates 82 communicate with the body 80 and saddle 81 so that cold may be conducted from the pipe 11 to the body 80 and to the saddle 81 and to the cooling plates 82.

Plural cooling plates 82 are carried by the body 80 in spaced array so that moisture laden air may pass between and about the cooling plates 82. In a preferred embodiment (FIG. 7) the cooling plates 82 have a configuration of a triangle with a point 83 opposite from and distal from the body 80 and cold pipe 11. This shape has a tendency to maximize thermal conduction of cold from the pipe 11 to the cooling plates 82 and water condensation.

The container 90 (FIGS. 8, 9, 10, 11) defines an interior volume 94 bounded by interconnected exterior walls 93 which are joined together at adjoining edge portions in an air-tight fashion. The volume 94 is of sufficient size to accommodate a condenser 60, and if desired, plural condensers 60 and related components. The container 90 defies an air inflow port 95 and an air outflow port 96. Both the inflow port 95 and the outflow port 96 communicate between the interior volume 94 and the exterior of the container 90 to allow air to flow into the volume 94 and to flow out of the volume 94. An air moving means 91, such as but not limited to a fan or vacuum, communicates with one of the ports 95, 96 to move air into and out of the volume 94. An auxiliary air heating means 102 may communicate with the air moving means 91 to artificially warm the air moving into the volume 94, such as to assist in melting ice and/or to increase moisture content of the air.

A known High Efficient Particulate Absorption (HEPA) type filter 97 communicates with the air inflow port 95 or air moving means 91 to prevent airborne contaminants and particulates from entering the volume 94 where such contaminants and particulates may contaminate generated water.

The air moving means 91 causes warm moisture laden air 110 to be drawn into the volume 94 through the air inflow ports 95 and the HEPA filters 97. The warm moist air 110 passes over and about the cooling plates 69 of the condenser 60. As the warm moist air passes over and about the cooling plates 69, 82 the temperature of the air 110 decreases to a temperature below the dewpoint. This temperature reduction causes moisture in the air 110 to condense into liquid water 111 which condenses on and around the condensers 60, and the cooling plates 69, 82. As more and more moisture condenses on the condenser 60, liquid water 110 is formed which drips and flows under the force of gravity from the condenser 60 and cooling plates 69, 82 to a fluid collection basin 100 below the condensers 60 within the container 90. The water 111 drips from the condensers 60 into the fluid collection basin 100 whereupon the water 111 is moved by known water moving means 101 to a storage apparatus (not shown). Because contaminants and particulates have been removed from the air 110 entering the container 90, the water 111 formed on the condensers 60 is of potable quality.

Cooled dry air 112 from which the moisture has been condensed/removed is vented from the container volume 94 through the air outflow port 96 as more warm moist air 110 enters the volume 94.

It is expressly contemplated the container 90 may be mobile, such as in a vehicle to capitalize on cold produced by an airconditioning pump/unit; may be constructed above a supporting ground surface as a separate structure, and may also be constructed below ground surface, such as in a vault, to utilize/capitalize upon thermal energy existing in the ground which may enhance the operation and efficiency of the condensers 60 by providing a relatively stable warm exterior temperature to the container 90 that may be used to minimize freezing of water 110 on the condensers 60 and cooling plates 69, 82 due to the temperatures thereof which may be far below 32° F. (0° C.) the freezing temperature of water 110.

In a further embodiment as shown in FIG. 7 the auxiliary air heating means 102 may be connected to the container 90 to supply warm/heated air into the volume 94 to prevent formation of ice on the condensers 60 which would negatively impact water generation. Electrically conductive wires (not shown) may be embedded within or carried upon the condenser 60 and/or the cooling plates 69, 82 and heated with electric current to prevent ice formation on the condenser 60 and/or cooling plates 69, 82.

Figure 10:
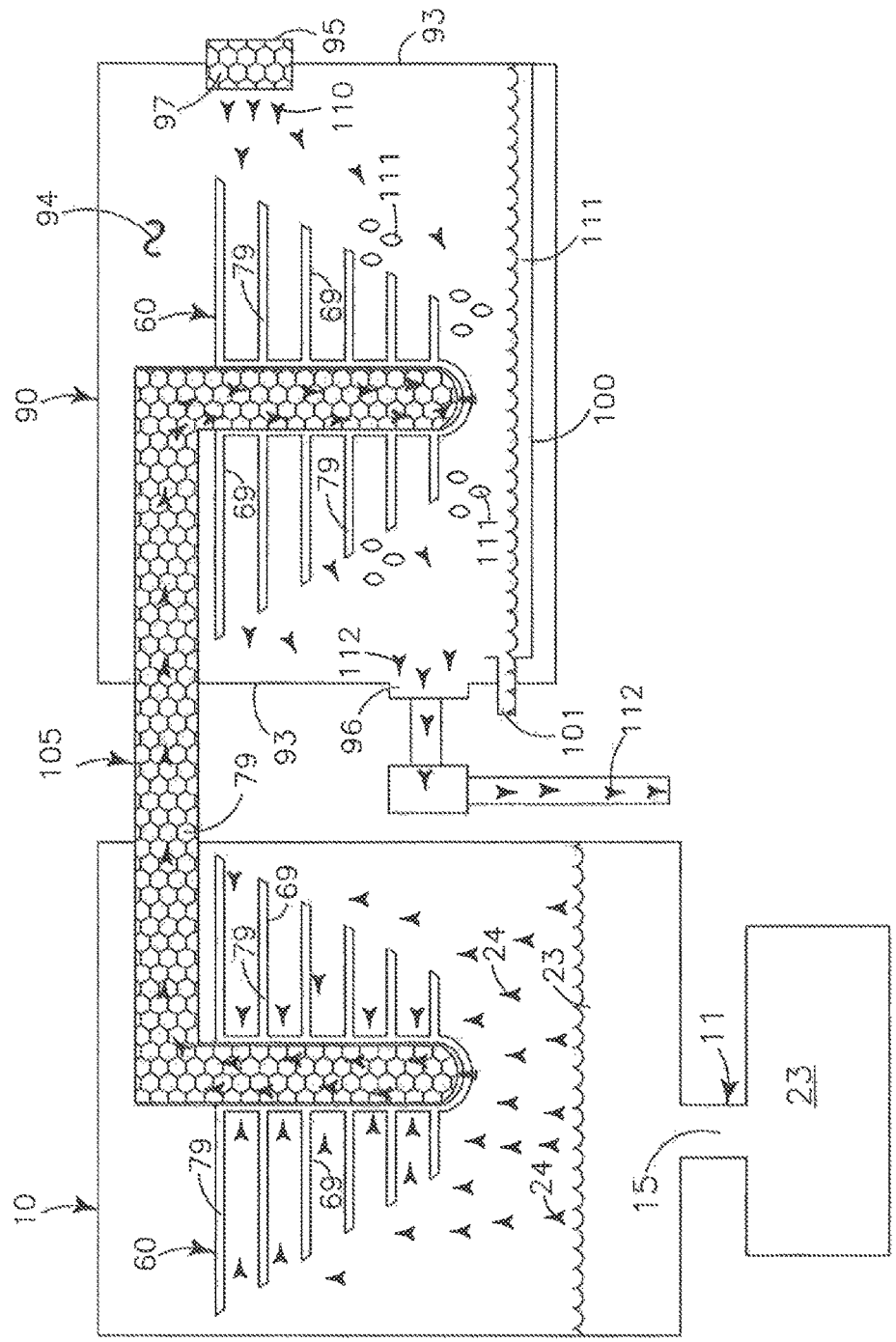
FIG. 10 is an orthographic block diagram of the instant system showing an industrial process and a cross section side view of a thermal transfer body directly exposed to cold vapors of LNG boil-off communicating the cold via a solid transfer element of the thermal transfer media to a thermal transfer body within a condenser container for condensing moisture laden air into liquid water collected in a fluid collection basin.
Figure 11:
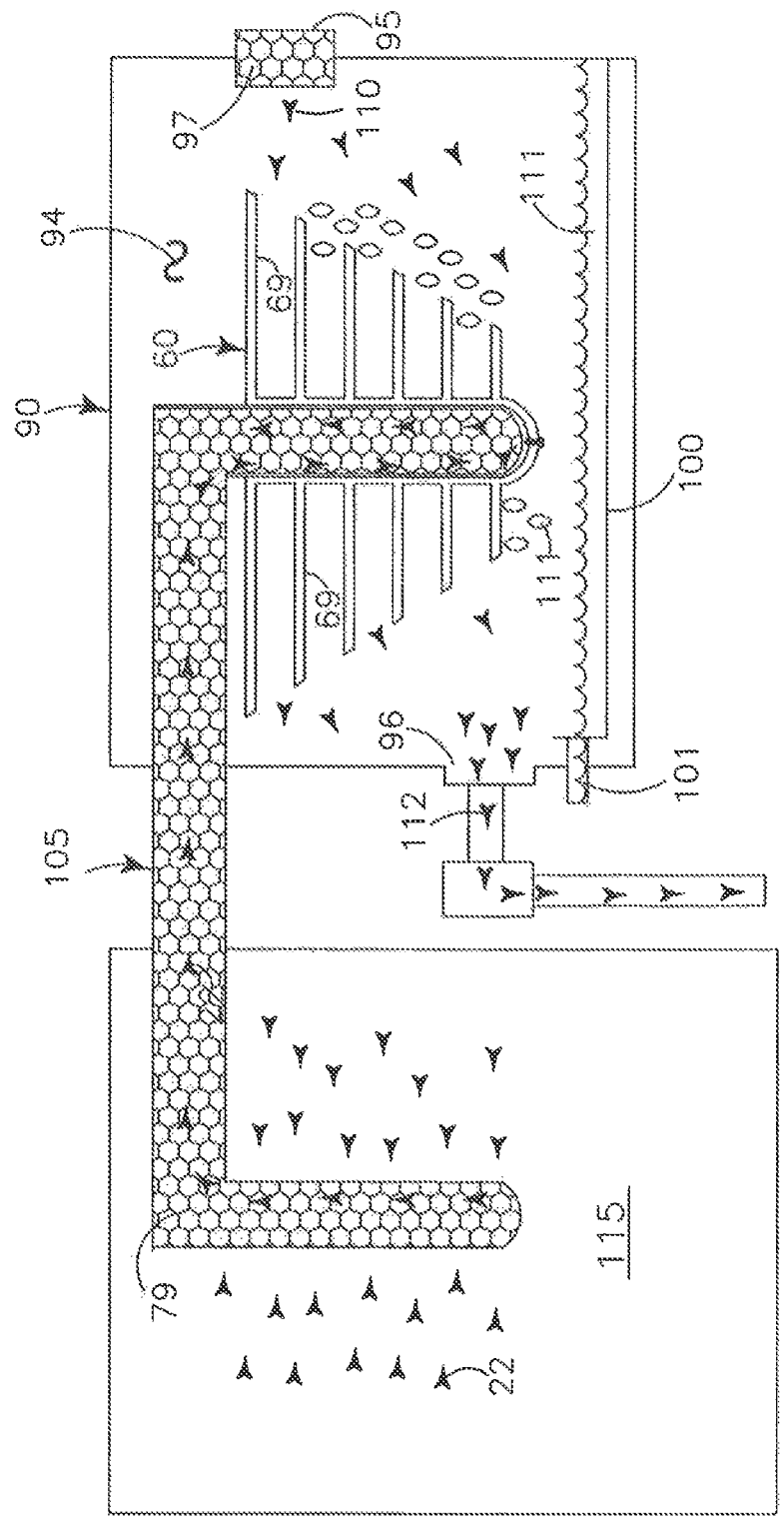
FIG. 11 is an orthographic cross section diagram of the instant system, similar to that of FIG. 10 showing an alternative cold source, in this case a cryocooler to generate cold for the water generation communicating with a solid transfer element.

As shown in FIG. 10, it is also contemplated a condenser 60 may be exposed to cryogen boil-off gasses 24, such as by placement of the condenser 60 within a cryogen storage container 23. The cold off gassing vapors 24 cause the condenser 60 to become cold. By use of a solid conduit 105 of thermal transfer media 79 the cold temperature is communicated to a condenser 60 carried in a container 90 to function as previously disclosed for water generation.

Depending upon the type of industrial process, such as processes where access to a pipe 11 containing cold fluids is minimal or restricted, exposing a condenser 60 to the cold "boil-off" vapors may be the most efficient method of collecting the cold.

In environments where access to electrical energy is limited or in circumstances/situations where the desire is to be "completely green" and "environmentally friendly" it Is contemplated the air moving means 91 and air warmers 102 may be powered by known solar cells (not shown) and known battery storage cells (not shown) connected to and recharged by the solar cells.

The above description has set out various features, functions, methods and other aspects of my invention. This has been done with regard to the currently preferred embodiments thereof. Time and further development may change the manner in which the various aspects are implemented.

The scope of protection accorded the inventions as defined by the claims is not intended to be limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

Having thusly described and disclosed a SYSTEM AND APPARATUS FOR ATMOSPHERIC WATER GENERATION USING ALTERNATE COLD SOURCES, Applicant files this Utility Patent Application.

I claim:

1. A condenser system for producing liquid water from environmental moisture laden air comprising:
    a cold source enclosure, a water condenser enclosure, an air moving means, a thermal condenser, a thermal conduit, and a water condenser;
    the thermal condenser, the thermal conduit, and the water condenser all formed, at least in part, from carbon graphitic foam thermal transfer media having a thermal conductivity of approximately between 1200 watts per meter Kelvin (W/m.K.) and 2200 W/m.K., and wherein the thermal condenser, the thermal conduit, and the water condenser are mechanically and thermally interconnected with one another such that thermal energy is conducted therethrough and therebetween the water condenser and the thermal condenser;
    the cold source enclosure defines an interior volume surrounded by peripheral interconnected walls so as to fluidly separate the interior volume from an exterior environment having moisture laden air and so as to at least partially enclose a cold source, and thermal energy from the cold source, within the interior volume;
    the thermal condenser has a body comprising an outer circumferential surface with a first end portion opposite and spaced apart from a second end portion, and a plurality of cooling plates positioned along the outer circumferential surface of the thermal condenser from the first end portion of the thermal condenser to the second end portion of the thermal condenser, wherein the plurality of cooling plates of the thermal condenser extend radially outward from the outer circumferential surface of the thermal condenser, the plurality of cooling plates of the thermal condenser having larger diameters proximate the first end portion of the thermal condenser compared to smaller diameters of the plurality of cooling plates proximate the second end portion of the thermal condenser, and wherein the thermal condenser is exposed to, and is in thermal connectivity with, the thermal energy generated by the cold source within the cold source enclosure;
    the water condenser enclosure defines an interior volume surrounded by peripheral interconnected walls so as to separate the interior volume from the exterior environment, the water condenser enclosure further having a water outflow port, an air inflow port, and an air outflow port, and the water outflow port, the air inflow port and the air outflow port communicate between the interior volume of the water condenser and the exterior environment;
    the air moving means to generate flow of the moisture laden air from the exterior environment into the interior volume through the air inflow port;
    the water condenser has a body comprising an outer circumferential surface with a first end portion opposite and spaced apart from a second end portion, and a plurality of cooling plates positioned along the outer circumferential surface of the water condenser from the first end portion of the water condenser to the second end portion of the water condenser, wherein the plurality of cooling plates of the water condenser extend radially outward from the outer circumferential surface of the water condenser, the plurality of cooling plates of the water condenser having larger diameters proximate the first end portion of the water condenser compared to smaller diameters of the plurality of cooling plates proximate the second end portion of the water condenser, and wherein the water condenser is positioned within the interior volume defined by the water condenser enclosure and is directly exposed to the moisture laden air within the water condenser enclosure; and
    the thermal conduit has a body with opposing first and second ends, and the first end of the thermal conduit mechanically and thermally communicates with the thermal condenser within the cold source enclosure, and the second end of the thermal conduit mechanically and thermally communicates with the water condenser within the water condenser enclosure so that thermal energy exposed to the thermal condenser is thermally conducted between and through the thermal condenser, the thermal conduit, and the water condenser;
    and wherein when the moisture laden air enters the interior volume of the water condenser enclosure through the air inflow port, the moisture laden air is exposed to the thermal energy conducted between the thermal condenser, the thermal conduit, and the water condenser, and wherein the thermal energy reduces a temperature of the moisture laden air, thereby producing condensation of moisture within the moisture laden air onto the water condenser within the water condenser enclosure to form liquid water.

2. A condenser system for producing liquid water from an environment containing moisture laden air comprising:
    a container defining an interior volume surrounded by peripherally interconnected walls so as to separate the interior volume from an exterior environment, the interior volume having a size sufficient to accommodate a water condenser, the container further having a water outflow port, an air inflow port, and an air outflow port all communicating between the exterior environment and the interior volume;
    a pipe having opposing end portions, an outer circumferential surface, and defining a medial channel extending between the opposing end portions, and wherein the pipe stores and/or transports liquefied natural gas in the medial channel, and wherein the pipe is at least partially within the interior volume of the container;

an air moving means to generate flow of moisture laden air from the exterior environment into the interior volume through the air inflow port;

the water condenser is attached to the pipe within the interior volume of the container, the water condenser formed at least in part of carbon graphitic foam thermal transfer media, the carbon graphitic foam thermal transfer media having a thermal conductivity of approximately between 1200 watts per meter Kelvin (W/m.K.) and 2200 W/m.K., the water condenser further has a body with a plurality of spacedly arrayed cooling plates and a saddle defining a curved surface that is sized and configured to directly frictionally engage with the outer circumferential surface of the pipe, and wherein each of the plurality of spacedly arrayed cooling plates have a triangular shape with a point distal from the saddle and the pipe, and wherein the saddle of the water condenser mechanically and thermally communicates with the outer circumferential surface of the pipe so that thermal energy exposed to the pipe is thermally conducted between and through the liquid natural gas, the pipe, and the water condenser; and wherein when moisture laden air passes over and about the plurality of spacedly arrayed cooling plates, the moisture laden air is exposed to the thermal energy conducted between the liquid natural gas, the pipe, the saddle and the plurality of spacedly arrayed cooling plates, and wherein the thermal energy reduces a temperature of the moisture laden air, thereby producing condensation of the moisture laden air onto the water condenser within the water condenser enclosure to form liquid water.

3. The condenser system for producing liquid water from moisture laden air of claim 1, and wherein the storage apparatus has a tubular main body and a protuberance extending angularly from the tubular main body, the protuberance having a length, an outer circumferential surface, and an outside diameter.

4. The condenser system for producing liquid water from moisture laden air of claim 3 wherein the water condenser has a body with a first end portion, a second end portion, a length, an outer circumferential surface, and a plurality of spacedly arrayed cooling plates, the body further defining a medial channel extending from a channel opening at the first end portion and terminating at a blocked end proximate the second end portion, and the body still further having an inner circumferential surface inside the medial channel, and wherein the plurality of cooling plates extend generally radially outwardly from the outer circumferential surface.

5. The condenser system for producing liquid water from moisture laden air of claim 4 wherein the water condenser slides axially over the protuberance of the storage apparatus, with the outer circumferential surface of the protuberance directly physically communicating with the inner circumferential surface of the water condenser medial channel.

6. The condenser system for producing liquid water from moisture laden air of claim 5 wherein the second end portion of the water condenser defines a bolt hole, and wherein the protuberance of the storage apparatus has a distal, blocked end which defines a blind hole, and wherein a fastener engages the bolt hole and the blind hole, thereby positionally securing the water condenser to the protuberance of the storage apparatus.

7. The condenser system for producing liquid water from moisture laden air of claim 5 wherein the length of the medial channel is substantially the same as the length of the protuberance.

8. The condenser system for producing liquid water from moisture laden air of claim 5 wherein the channel opening of medial channel of the water condenser is larger than the outside diameter of the protuberance of the storage apparatus.

9. The condenser system for producing liquid water from moisture laden air of claim 3 wherein the plurality of spacedly arrayed cooling plates have larger diameters proximate the first end portion and smaller diameters proximate the second end portion.

10. The condenser system for producing liquid water from moisture laden air of claim 1 wherein the carbon graphitic foam defines a plurality of through pores.

11. The condenser system for producing liquid water from moisture laden air of claim 1 wherein the water condenser is formed of a solid block of the carbon graphitic foam thermal transfer media.

* * * * *